United States Patent
Dry et al.

(10) Patent No.: US 10,023,945 B2
(45) Date of Patent: *Jul. 17, 2018

(54) DIRECT SMELTING PROCESS

(75) Inventors: Rodney James Dry, City Beach (AU); Jacques Pilote, Woodlands (AU)

(73) Assignee: Tata Steel Limited, Mumbai (IN)

( * ) Notice: Subject to any disclaimer, the term of this patent is extended or adjusted under 35 U.S.C. 154(b) by 0 days.

This patent is subject to a terminal disclaimer.

(21) Appl. No.: 13/698,475

(22) PCT Filed: May 18, 2011

(86) PCT No.: PCT/AU2011/000580
§ 371 (c)(1),
(2), (4) Date: Jan. 10, 2013

(87) PCT Pub. No.: WO2011/143703
PCT Pub. Date: Nov. 24, 2011

(65) Prior Publication Data
US 2013/0116105 A1 May 9, 2013

(30) Foreign Application Priority Data
May 18, 2010 (AU) ................... 2010902162
Sep. 15, 2010 (AU) ................... 2010904167

(51) Int. Cl.
*C21B 3/04* (2006.01)
*C22C 38/12* (2006.01)
(Continued)

(52) U.S. Cl.
CPC .............. *C22C 38/12* (2013.01); *C03C 3/062* (2013.01); *C21B 3/04* (2013.01); *C21B 11/08* (2013.01);
(Continued)

(58) Field of Classification Search
CPC . C03C 3/062; C21C 5/54; C22C 38/12; Y02P 10/136; Y02P 10/216; C21B 11/08; C21B 13/0006; C21B 13/0013; C21B 3/04
(Continued)

(56) References Cited

U.S. PATENT DOCUMENTS 2,865,734 A * 12/1958 Klemantaski ............... 75/453
3,420,659 A   1/1969 Rathmann
(Continued)

FOREIGN PATENT DOCUMENTS

AU       470915        3/1974
AU     9341686 A  *  1/1994
(Continued)

OTHER PUBLICATIONS

International Search Report issued by the Australian Patent Office in International Application No. PCT/AU2011/000580, dated Aug. 23, 2011 (3 pages).
(Continued)

*Primary Examiner* — Jenny R Wu
(74) *Attorney, Agent, or Firm* — Banner & Witcoff, Ltd.

(57) ABSTRACT

A molten bath-based direct smelting process comprises controlling the process conditions in a direct smelting vessel so that molten slag in a molten bath of metal and slag in the vessel has a viscosity in a range of 0.5-5 poise when the slag temperature is in a range of 1400-1550° C. in the molten bath in the vessel.

13 Claims, 2 Drawing Sheets

(51) Int. Cl.
*C21B 11/08* (2006.01)
*C21B 13/00* (2006.01)
*C21C 5/54* (2006.01)
*C03C 3/062* (2006.01)
*C22C 33/04* (2006.01)

(52) U.S. Cl.
CPC ...... *C21B 13/0006* (2013.01); *C21B 13/0013* (2013.01); *C21C 5/54* (2013.01); *C22C 33/04* (2013.01); *Y02P 10/136* (2015.11); *Y02P 10/216* (2015.11)

(58) Field of Classification Search
USPC .................................................. 75/500; 420/8
See application file for complete search history.

(56) References Cited

U.S. PATENT DOCUMENTS

| | | | |
|---|---|---|---|
| 3,597,189 A | 8/1971 | Sinha | |
| 3,765,868 A | 10/1973 | Moklebust | |
| 3,850,615 A * | 11/1974 | Reeves | C21B 13/006 75/435 |
| 4,529,439 A * | 7/1985 | Barber | 75/10.62 |
| 5,746,805 A * | 5/1998 | Queneau | C21B 13/14 75/446 |
| 5,830,420 A | 11/1998 | Borowiec et al. | |
| 6,423,115 B1 * | 7/2002 | McCarthy | C21B 11/00 75/414 |
| 6,428,603 B1 | 8/2002 | Batterham | |
| 7,727,304 B2 | 6/2010 | Ng et al. | |
| 7,780,756 B2 | 8/2010 | Barnes et al. | |
| 2002/0100345 A1 * | 8/2002 | Granati et al. | 75/401 |
| 2005/0028643 A1 * | 2/2005 | Tanaka | C21B 13/0006 75/435 |
| 2006/0278041 A1 * | 12/2006 | Harada | C10L 9/02 75/484 |
| 2006/0289095 A1 * | 12/2006 | Fan | C21C 7/076 148/625 |
| 2011/0024681 A1 * | 2/2011 | Sugiyama et al. | 252/182.33 |
| 2011/0135919 A1 | 6/2011 | Trabzuni et al. | |
| 2012/0048065 A1 * | 3/2012 | Reichel et al. | 75/500 |

FOREIGN PATENT DOCUMENTS

| | | |
|---|---|---|
| CN | 1038137 C | 4/1998 |
| CN | 101619371 A | 1/2010 |
| CN | 101665871 A | 3/2010 |
| EP | 1099746 A2 | 5/2001 |
| EP | 1437420 | 7/2004 |
| JP | S4838221 | 6/1973 |
| JP | 58049622 A * | 3/1983 |
| JP | H0144772 | 5/1983 |
| JP | H05239521 | 9/1993 |
| JP | 2003/105452 A | 4/2003 |
| JP | 2004131753 | 4/2004 |
| JP | 2006516676 | 7/2006 |
| JP | 2007177295 A | 7/2007 |
| JP | 2009507134 | 2/2009 |
| JP | 4781813 B2 | 9/2011 |
| RU | 2245371 C2 * | 1/2005 |
| WO | WO 2004/06541 A1 | 8/2004 |
| WO | WO 2005/024074 | 3/2005 |
| WO | 2009125814 | 10/2009 |
| WO | 2011143703 A1 | 11/2011 |

OTHER PUBLICATIONS

International Preliminary Report on Patentability issued by the Australian Patent Office in International Application No. PCTAU2011/000580, dated Sep. 11, 2012 (4 pages).

Japanese Patent Appln. 2013-510448, Office Action, dated Jan. 20, 2015 (with English Translation).

Nafzifer, R. H. et al, "Prereduction and Melting of Domestic Titaniferous Materials", Metallurgical and Materials Transactions B—Process Metallurgy and Materials Processing Science, Spring New York LLC, United States, vol. 14B, No. 1, Mar. 1, 1983, pp. 55-62, XP009177384, ISSN: 0360-2141.

Mohanty J K et al, "Characterisation and utilisation magnetite of Boula-Nausahi igneous complex, Orissa, India", Scandanavian Journal of Metallurgy, Munksgaard, Copenhagen, DK, vol. 28 No. 6, Dec. 1, 1999, pp. 254-259, XP009177393, ISSN: 0371-0459.

* cited by examiner

Slag Tertiary System

Slag liquidus measurements on high TiO$_2$ slag

DIRECT SMELTING PROCESS

CROSS REFERENCE TO RELATED APPLICATIONS

This application is a national phase application based on PCT/AU2011/000580, filed May 18, 2011, which claims the priority of Australian Patent Application No, 2010904167, filed Sep. 15, 2010, and Australian Patent Application No. 2010902162, filed May 18, 2010, the content of all of which is incorporated herein by reference.

The present invention relates to a molten bath-based direct smelting process for producing molten metal from a metalliferous feed material that contains iron oxides and titanium oxides in a direct smelting vessel.

The metalliferous feed material may be any material that contains iron oxides and titanium oxides. One example of a suitable feed material is titanium magnetite. This is also known as titanomagnetite or "iron sands". Another example is ilmenite. Suitable sources of titanium magnetite are found in SW China, and NZ. Suitable sources of ilmenite are found in Western Australia and Madagascar. The present invention is not confined to titanium magnetite and ilmenite and is not confined to titanium magnetite and ilmenite from these sources.

The metalliferous feed material may also be any material that contains iron oxides and titanium oxides and other metal oxides such as vanadium oxides. One example of a suitable feed material is titanium-vanadium magnetite, such as found in SW China and NZ or as a residue from a $TiO_2$ pigment feed process (such as the Becher process).

A known molten bath-based direct smelting process is generally referred to as the HIsmelt process, is described in a considerable number of patents and patent applications in the name of the applicant.

The HIsmelt process is associated particularly with producing molten iron from iron ore.

In the context of producing molten iron, the HIsmelt process includes the steps of:

(a) forming a bath of molten iron and slag in a direct smelting vessel;

(b) injecting into the bath: (i) iron ore, typically in the form of fines; and (ii) a solid carbonaceous material, typically coal, which acts as a reductant of the iron ore feed material and a source of energy; and (c) smelting iron ore to iron in the bath.

The term "smelting" is herein understood to mean thermal processing wherein chemical reactions that reduce metal oxides take place to produce molten metal.

In the HIsmelt process solid feed materials in the form of metalliferous material and solid carbonaceous material are injected with a carrier gas into the molten bath through a number of lances which are inclined to the vertical so as to extend downwardly and inwardly through the side wall of the direct smelting vessel and into a lower region of the vessel so as to deliver at least part of the solid feed materials into the metal layer in the bottom of the vessel. The solid feed materials and the carrier gas penetrate the molten bath and cause molten metal and/or slag to be projected into a space above the surface of the bath and form a transition zone. A blast of oxygen-containing gas, typically oxygen-enriched air or pure oxygen, is injected into an upper region of the vessel through a downwardly extending lance to cause post-combustion of reaction gases released from the molten bath in the upper region of the vessel. In the transition zone there is a favourable mass of ascending and thereafter descending droplets or splashes or streams of molten metal and/or slag which provide an effective medium to transfer to the bath the thermal energy generated by post-combusting reaction gases above the bath.

Typically, in the case of producing molten iron, when oxygen-enriched air is used, it is fed at a temperature of the order of 1200° C. and is generated in hot blast stoves. If technically pure cold oxygen is used, it is typically fed at or close to ambient temperature.

Off-gases resulting from the post-combustion of reaction gases in the direct smelting vessel are taken away from the upper region of the vessel through an off-gas duct.

The direct smelting vessel includes refractory-lined sections in the lower hearth and water cooled panels in the side wall and the roof of the vessel, and water is circulated continuously through the panels in a continuous circuit.

The HIsmelt process enables large quantities of molten iron, typically at least 0.5 Mt/a, to be produced by direct smelting in a single compact vessel.

However, the view of the applicant up to this point in time has been that the HIsmelt process is not suitable for smelting metalliferous feed material that contains iron oxides and titanium oxides such as titanomagnetite and ilmenite and optionally also contains other metal oxides such as vanadium oxides. The applicant has now carried out research and development work on the HIsmelt process, particularly work investigating the characteristics of the slag in the process, that indicates that appropriate control of process conditions makes it possible to smelt metalliferous feed material that contains iron oxides and titanium oxides and optionally vanadium oxides in the HIsmelt process. This finding also applies to other molten bath-based processes that have similar characteristics to or incorporate the HIsmelt process.

The above discussion is not intended to be an admission of the common general knowledge in Australia and elsewhere.

The present invention provides a molten bath-based direct smelting process that comprises controlling the process conditions in a direct smelting vessel so that molten slag in a molten bath of metal and slag in the vessel has a viscosity in a range of 0.5-5 poise when the slag temperature is in a range of 1400-1550° C. in the molten bath in the vessel.

The present invention provides a direct smelting process that comprises supplying (a) a metalliferous feed material that contains iron oxides and at least 3 wt. % titanium oxides (b) a solid carbonaceous feed material, and (c) an oxygen-containing gas into a direct smelting vessel containing a molten bath of iron and slag and direct smelting the metalliferous feed material in the vessel and producing process outputs of molten iron, molten slag containing titanium oxides, and an off-gas, and the process being characterised by controlling the process conditions, as described herein, so that the molten slag has a viscosity in a range of 0.5-5 poise when the slag temperature is in a range of 1400-1550° C. in the molten bath in the direct smelting vessel.

The term "molten slag" is understood herein to mean slag that is completely liquid.

The term "molten slag" is also understood herein to mean slag that comprises a slurry of a solid material and a liquid phase.

The solid material in the molten slag may be a solid oxide phase at the slag temperature in the process, whereby the slag is a slurry of a solid oxide phase in a liquid slag phase.

The term "process conditions" is intended herein to have a wide meaning and to extend, by way of example, to (a) operating conditions within the direct smelting vessel, such as temperature and pressure and injection rates of the solid feed materials and the oxygen-containing gas into the vessel, (b) the composition of the molten bath, particularly the slag composition, and (c) the characteristics of the molten bath. The composition of the molten bath may include the selection of the constituents of the slag so that the slag is a molten slag, as described herein, in the temperature range of 1400-1550° C. of the molten bath. As indicated in the definition of "molten slag" set out above, the molten slag may include a solid oxide phase and a liquid slag phase at the operating temperature range of the process. The characteristics of the molten slag include, by way of example, the viscosity and/or the oxygen potential of the molten slag mentioned above. The characteristics also include by way of example, the basicity of the molten slag and the turbulence of the slag. These characteristics are a function of operating conditions and slag composition.

The present invention is based on a realisation of the applicant as a consequence of the above-mentioned research and development work that:

(a) there are operating windows for direct smelting metalliferous feed materials that contain iron oxides, titanium oxides and optionally vanadium oxides in the HIsmelt process and other molten bath-based processes that have similar characteristics to or incorporate the HIsmelt process and;

(b) molten bath-based processes operating within these windows provide an opportunity to smelt these titaniferous materials to produce molten iron more effectively than is the case in blast furnaces that are currently being used to smelt titanomagnetites, including titanomagnetites that contain vanadium oxides.

In particular, the applicant has realised that the present invention provides an opportunity to produce two valuable products from molten bath-based smelting processes of the HIsmelt type process, namely (a) a molten iron product which may contain vanadium metal and (b) a slag product that has high concentrations of titanium oxides in the form of $TiO_2$, such as at least 50%, that can be used as a feed material for the sulphate process for producing pigment-grade titania. In particular, the applicant has realised that there is an opportunity with molten bath-based processes to control the cooling rate of the molten slag discharged from the process to preferentially form microstructures that are amenable to processing in the sulphate process.

The process may comprise controlling the process conditions by controlling the slag composition and the temperature of the molten bath to be below, typically slightly below, the liquidus temperature of the slag so that a solid oxide phase precipitates from a liquid phase of the molten slag, thereby controlling the viscosity of the slag.

The terms "viscosity" and "liquidus temperature" as used herein are understood to mean the viscosity and liquidus temperature as calculated by FactSage software (for liquidus temperature, FactSage 6.1 or later and for viscosity "FactSage Viscosity 6.0 or later"). Given the potential for non-standard results arising from different measuring and calculation techniques, rationalisation via FactSage calculation is defined to be implicit in the meaning of these terms. Such calculations, when executed, are to be fully consistent with guidelines for using the FactSage software and, if necessary, are to be reviewed and authorised by the owners of the FactSage software. In particular, calculations which (deliberately or otherwise) omit certain possible chemical species combinations will not be considered consistent with "viscosity" and "liquidus temperature" as used herein.

The process may comprise controlling the process conditions so that the solid material in the molten slag is at least 5% of the molten slag.

The solid material in the molten slag may be at least 10% of the molten slag.

The solid material in the molten slag may be less than 30% of the molten slag.

The solid material in the molten slag may comprise 15-25% of the molten slag.

The metalliferous feed material may be any material that contains iron oxides and titanium oxides. Examples of suitable feed materials are titanium magnetite, titanomagnetite and ilmenite.

In situations where the metalliferous feed material comprises titanomagetite only, the titanium oxides may be less than 40 wt. % of the metalliferous feed material.

In situations where the metalliferous feed material comprises titanomagetite only, the titanium oxides may be less than 30 wt. % of the metalliferous feed material.

In situations where the metalliferous feed material comprises titanomagetite and ilmenite, the titanium oxides may be less than 50 wt. % of the metalliferous feed material.

The metalliferous feed material may also be any material that contains iron oxides and titanium oxides and other metal oxides such as vanadium oxides. One example of a suitable feed material is titanium-vanadium magnetite.

In situations where the metalliferous material contains vanadium oxides, the process includes producing process outputs of molten iron and vanadium, molten slag containing titanium oxides and vanadium oxides, and an off-gas.

Depending on the process conditions, the partition of vanadium between the metal and slag outputs of the process may be at least 50%, typically at least 65%, more typically at least 80%, to the metal output.

In general terms, and not only in situations where the metalliferous material contains vanadium oxides, the process may comprise controlling the process conditions by controlling the ratio of the concentrations of iron in the slag to carbon in the metal to be less than 2:1, typically less than 1.5:1, more typically 1:1 to 1.3:1.

The process may comprise controlling the process conditions so that the molten slag has a high oxygen potential.

The term "high" in the context of "oxygen potential" is understood herein to mean high in relation to blast furnace slag.

The process may comprise controlling the process conditions so that the oxygen potential of the molten slag is sufficiently high to minimise reduction of titanium oxides in the slag from a +4 valence state to a lower valence state. Lower valence states reduce slag viscosity and increase the risk of forming a foamy slag. A foamy slag is undesirable because it creates process control issues.

The process may comprise controlling the process conditions so that the FeO content of the molten slag is at least 3 wt. % so that the molten slag has a high oxygen potential.

The process may comprise controlling the process conditions so that the FeO content of the molten slag is at least 4 wt. % so that the molten slag has a high oxygen potential.

The process may comprise controlling the process conditions so that the FeO content of the molten slag is at least 5 wt. % so that the molten slag has a high oxygen potential.

The process may comprise controlling the process conditions so that the FeO content of the molten slag is less than 6 wt. %.

The process may comprise controlling the process conditions so that the FeO content of the molten slag is less than 10 wt. %.

The process may comprise controlling the process conditions so that the carbon content of the molten slag is at least 3 wt. %.

The process may comprise controlling the process conditions so that the carbon content of the molten slag is at least 4 wt. %.

The process may comprise controlling the process conditions so that the carbon content of the molten slag is less than 5 wt. %.

The process may comprise controlling the process conditions so that the viscosity of the molten slag is in the range of 0.5-4 poise.

The process may comprise controlling the process conditions so that the viscosity of the molten slag is in the range of 0.5-3 poise.

The process may comprise controlling the process conditions so that the viscosity of the molten slag is greater than 2.5 poise.

The process may include adding one or more than one additive to facilitate control of molten slag characteristics, for example slag composition and/or slag viscosity, in the molten bath.

By way of example, the additive may be selected to control basicity of the molten slag, for example by CaO addition, to decrease the viscosity of the slag and minimise the risk of a foamy slag.

The process may include controlling the process conditions so that the molten slag has the following constituents in the stated ranges:

$TiO_2$: at least 15 wt. %,
$SiO_2$: at least 15 wt. %,
CaO: at least 15 wt. %,
$Al_2O_3$: at least 10 wt. %, and
FeO: at least 3 wt. %.

The molten slag may comprise at least 20 wt. % $TiO_2$.
The molten slag may comprise at least 50 wt. % $TiO_2$.
The molten slag may comprise 15-20 wt. % $SiO_2$.
The molten slag may comprise 15-30 wt. % CaO.
The molten slag may comprise 10-20 wt. % $Al_2O_3$.
The molten slag may comprise 4-10 wt. % FeO.

The slag composition may include other constituents, such as MnO.

Specific examples of slag compositions in accordance with the present invention are as follows.

Chemistry A

| | |
|---|---|
| $SiO_2$ | 18.8 wt. % |
| $AL_2O_3$ | 15.2 wt. % |
| CaO | 15.3 wt. % |
| MgO | 10.9 wt. % |
| MnO | 0 |
| FeO | 4.9 wt. % |
| $TiO_2$ | 33.1 wt. % |

Chemistry B

| | |
|---|---|
| $SiO_2$ | 16.7 wt. % |
| $AL_2O_3$ | 13.0 wt. % |
| CaO | 25.1 wt. % |
| MgO | 10.2 wt. % |
| MnO | |
| FeO | 4.9 wt. % |
| $TiO_2$ | 28.8 wt. % |

Chemistry C

| | |
|---|---|
| $SiO_2$ | 19.35 wt. % |
| $AL_2O_3$ | 16.46 wt. % |

-continued

| | |
|---|---|
| CaO | 16.17 wt. % |
| MgO | 12.1 wt. % |
| MnO | 2.16 wt. % |
| FeO | 6.0 wt. % |
| $TiO_2$ | 25.7 wt. % |

Chemistries A and B are based on the use of 100% feed material in the form of a Chinese titanomagnetite and chemistry C is based on the use of 100% feed material in the form of a NZ titanomagnetite.

The process may include operating the process above atmospheric pressure in the direct smelting vessel.

The oxygen-containing gas may be oxygen-enriched air or technical grade oxygen.

The process may comprise supplying solid feed materials into the vessel by injecting metalliferous feed material and solid carbonaceous material and a carrier gas into the molten bath via solid material injection lances that extend downwardly and inwardly through a side wall of the vessel so that the solid feed materials at least partially penetrate a molten iron layer of the molten bath.

The process may comprise controlling the process, including controlling the injection of the solid feed materials and the carrier gas, to produce substantial agitation of the molten bath.

The extent of the agitation of the molten bath may be such that there is a substantially uniform temperature in the bath.

The process may comprise discharging the molten metal and the molten slag outputs of the process as separate process streams.

The process may comprise controlling the cooling rate of the molten slag discharged from the process to preferentially form microstructures that are amenable to processing in the sulphate process.

The process may be the HIsmelt process as described above.

The process may be a variant of the HIsmelt process involving a HIsmelt vessel in conjunction with either (a) a smelt cyclone on a direct smelting vessel, such as described in U.S. Pat. No. 6,440,195 and (b) pre-reduction of the metalliferous feed material prior to supplying the feed material to the direct smelting vessel.

The present invention also provides a direct smelting vessel when used to smelt a metalliferous feed material that contains iron oxides and at least 3 wt. % titanium oxides via a molten bath-based direct smelting process, with the vessel containing a molten bath of metal and slag, and with the molten slag having a temperature range of 1400-1550° C. and a viscosity in a range of 0.5-5 poise.

The present invention also provides a molten iron product which may contain vanadium metal produced by the above-described direct smelting process.

The present invention also provides a slag product that has high concentrations of titanium oxides in the form of $TiO_2$, such as at least 50%, produced by the above-described direct smelting process.

The present invention also provides a feed material for the sulphate process for producing pigment-grade titania produced by the above-described direct smelting process.

The present invention is described in more detail hereinafter with reference to the accompanying drawings, of which:

Figure 1:
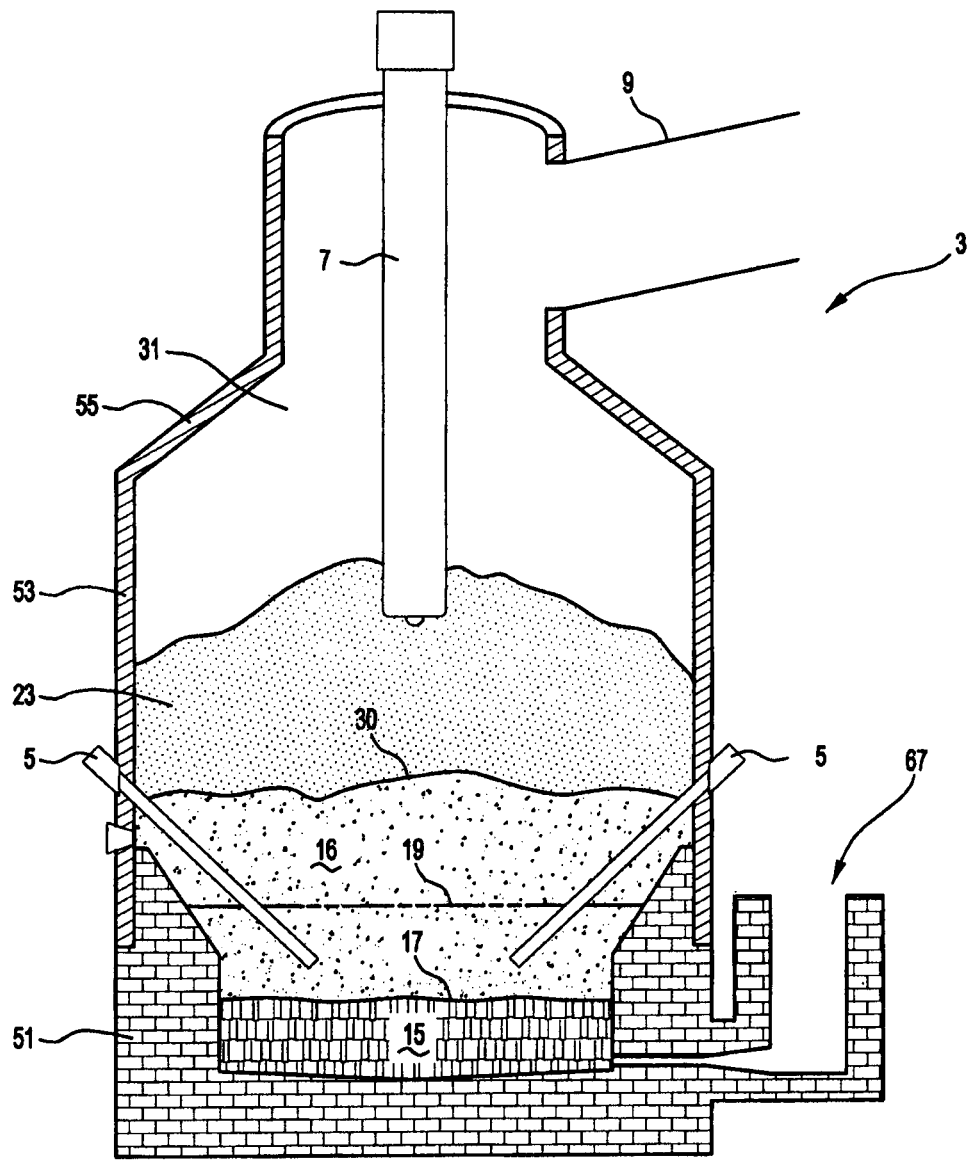
FIG. 1 is a diagrammatic view of a direct smelting vessel operating in accordance with one embodiment of a direct smelting process of the present invention.

The following description is in the context of smelting titanomagnetite to produce molten iron via the HIsmelt process. The present invention is not limited to smelting titanomagnetite and extends to smelting any suitable metalliferous feed material that contains iron oxides and titanium oxides. For example, the present invention extends to smelting titanium-vanadium magnetite. In addition, the present invention is not limited to the HIsmelt process and extends to any molten bath-based process of the HIsmelt type of process that can generate the necessary process conditions. In particular, by way of example, the present invention extends to variants of the HIsmelt Process that include (a) a smelt cyclone on a direct smelting vessel, such as described in U.S. Pat. No. 6,440,195 and (b) pre-reduction of the metalliferous feed material prior to supplying the feed material to the direct smelting vessel.

As is indicated above, the HIsmelt process is described in a considerable number of patents and patent applications in the name of the applicant. By way of example, the HIsmelt process is described in International application PCT/AU96/00197 in the name of the applicant. The disclosure in the patent specification lodged with the International application is incorporated herein by cross-reference.

The process is based on the use of a direct smelting vessel 3.

The vessel 3 is of the type described in detail in International applications PCT/AU2004/000472 and PCT/AU2004/000473 in the name of the applicant. The disclosure in the patent specifications lodged with these applications is incorporated herein by cross-reference.

The vessel 3 has a hearth 51 that includes a base and sides formed from refractory bricks, a side wall 53 which form a generally cylindrical barrel extending upwardly from the sides of the hearth and include an upper barrel section and a lower barrel section, a roof 55, an off-gas duct 9 in an upper section of the vessel 3, a forehearth 67 for discharging molten metal continuously from the vessel 3, and a tap hole (not shown) for discharging molten slag periodically from the vessel 3.

In use, the vessel contains a molten bath of iron and slag which includes a layer 15 of molten metal and a layer 16 of molten slag on the metal layer 15. The arrow marked by the numeral 17 indicates the position of the nominal quiescent surface of the metal layer 15 and the arrow marked by the numeral 19 indicates the position of nominal quiescent surface of the slag layer 16. The term "quiescent surface" is understood to mean the surface when there is no injection of gas and solid materials into the vessel. Typically, the temperature of the molten bath is in a range of 1400-1550° C.

The vessel 3 is fitted with a downwardly extending water-cooled hot air blast ("HAB") lance 7 extending into a top space of the vessel 3 and a plurality of water-cooled solids injection lances 5 extending downwardly and inwardly through a side wall and into the slag. The lances 5 extend downwardly and inwardly at an angle of 30-60° to the vertical through the side wall and into the slag layer 16 in the molten bath. The position of the lances 5 is selected so that the lower ends are above the quiescent surface 17 of the metal layer 15 of the molten bath.

In use, titanomagnetite and coal and slag additives entrained in a carrier gas (typically $N_2$) are directly injected into the bath via the solids injection lances 5.

The momentum of the injected solid materials/carrier gas causes the solid material and gas to penetrate the metal layer 15. The coal is devolatilised and thereby produces substantial volumes of gas in the metal layer 15. Carbon partially dissolves into the metal and partially remains as solid carbon. The iron oxides in the titanomagnetite are smelted to molten metal and the smelting reaction generates carbon monoxide gas. The gases transported into the metal layer 15 and generated via devolatilisation and smelting produce significant buoyancy uplift of molten metal, solid carbon, unreacted solid material in the titanomagnetite (predominantly $TiO_2$), and slag (drawn into the metal layer 15 as a consequence of solid/gas/injection) from the metal layer 15 which generates an upward movement of splashes, droplets, and streams of molten metal and slag and entrained unreacted titanomagetite, and these splashes, and droplets, and streams entrain slag as they move through the slag layer 16.

The buoyancy uplift of the above-described material causes substantial agitation in the metal layer 15 and the slag layer 16, with the result that the slag layer 16 expands in volume and has a surface indicated by the arrow 30. The extent of agitation is such that there is reasonably uniform temperature in the metal and the slag regions—typically, 1400-1550° C. with a temperature variation of the order of 30° in each region.

In addition, the upward movement of the above-described material extends into a top space 31 of the vessel 3 that is above the molten bath in the vessel and:
(a) forms a transition zone 23; and
(b) projects some molten material (predominantly slag) beyond the transition zone and onto the section of the side wall of the vessel 3 that is above the transition zone 23.

In general terms, the slag layer 16 is a liquid continuous volume, with solid material and gas bubbles, and the transition zone 23 is a gas continuous volume with splashes, droplets, and streams of molten metal and slag. Alternatively, the slag layer 16 may be described as a slurry of solid material in a liquid phase with a dispersion of gas bubbles in the liquid phase.

The position of the oxygen-containing gas lance 7 and the gas flow rate through the lance 7 are selected so that the oxygen-containing gas penetrates the central region of the transition zone 23 and maintains an essentially metal/slag free space (not shown) around the end of the lance 7. The lance 7 includes an assembly which causes the oxygen-containing gas to be injected in a swirling motion into the vessel.

The injection of the oxygen-containing gas via the lance 7 post-combusts reaction gases CO and $H_2$ in the transition zone 23 and in the free space around the end of the lance 7 and generates high temperatures of the order of 2000° C. or higher in the gas space. The heat is transferred to the ascending and descending splashes droplets, and streams, of material from the metal layer and the heat is then partially transferred to the metal layer 15 when the material falls downwardly to the metal layer 15.

The described embodiment of the process of the present invention comprises controlling the process conditions so that the molten slag (a) is within a selected composition range so that the slag is a molten slag, as described herein, (b) has a high oxygen potential, and (c) has a viscosity in a range of 1-5 poise when the slag temperature is in a range of 1400-1550° C. in the molten bath in the vessel 3.

The necessary control of process conditions can be achieved by one or more than one of a range of options, including but not limited to controlling the FeO content of the molten slag to achieve the required high oxygen potential and controlling the CaO content of the molten slag to achieve the required viscosity in the range of 1-5 poise when the slag temperature is in the range of 1400-1550° C. in the molten bath in the vessel 3.

More particularly, in the described embodiment the necessary control of process conditions includes selecting the feed materials and operating conditions so that the molten slag has the following constituents in the stated range of 1400-1550° C. of the molten bath:

$TiO_2$: at least 15 wt. %,
$SiO_2$: at least 15 wt. %,
CaO: at least 15 wt. %,
$Al_2O_3$: at least 10 wt. %, and
FeO: at least 3 wt. %.

More particularly, in the described embodiment the necessary control of process conditions includes controlling the slag composition so that the molten slag is sub-liquidus, preferably slightly sub-liquidus, for that slag composition in the stated range of 1400-1550° C. of the molten bath so that a solid oxide phase precipitates from the liquid slag in an amount of 5-25% by volume of the slag. The resultant molten slag is a slurry of a solid oxide phase in a liquid slag phase. The precipitated solid oxide phase contributes to controlling the viscosity of the molten slag as required for the described embodiment of the process. In addition, the viscous molten slag, is well-suited to form a protective coating on the refractories of the vessel in contact with the slag.

Figure 2:
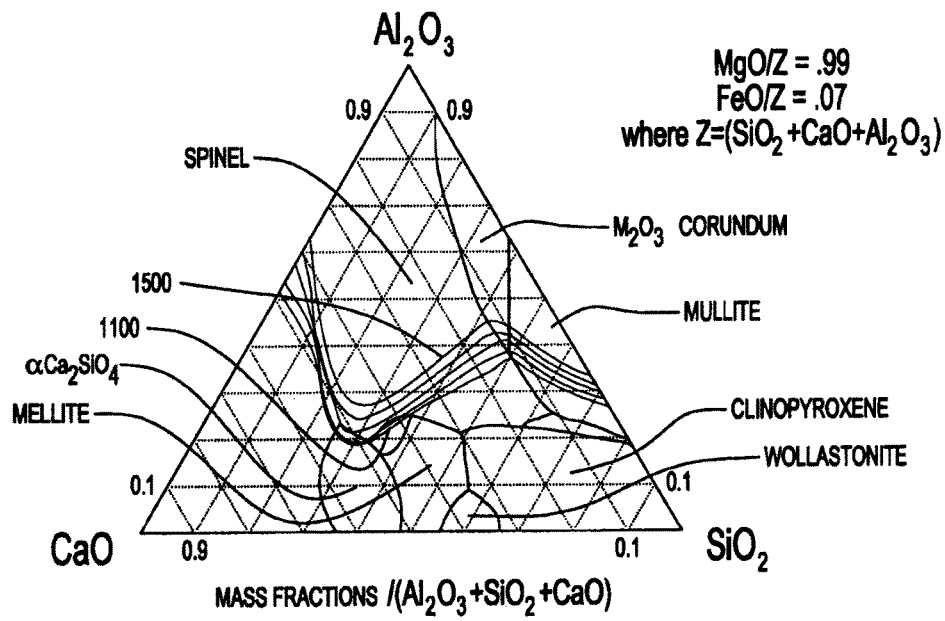
FIG. 2 is a tertiary phase diagram for calcia, alumina, and silica in slag in one embodiment of the direct smelting process of the present invention.

FIG. 2 is a tertiary phase diagram for three main slag constituents of calcia, alumina, and silica in one embodiment of the direct smelting process of the present invention. More particularly, the phase diagram focuses on two main gangue constituents of alumina and silica and a flux additive, namely calcia. The phase diagram was sourced from Fact-Sage 6.1. The phase diagram illustrates the impact of the slag composition on the phases in the slag. In particular, it can be determined from FIG. 2 that if a higher viscosity slag (i.e. a slag having a viscosity of at least 2.5 poise) is required, this can be achieved by controlling the slag composition, for example by adjusting the calcia addition, and other process conditions to precipitate melilite solid phase from the molten slag.

Figure 3:
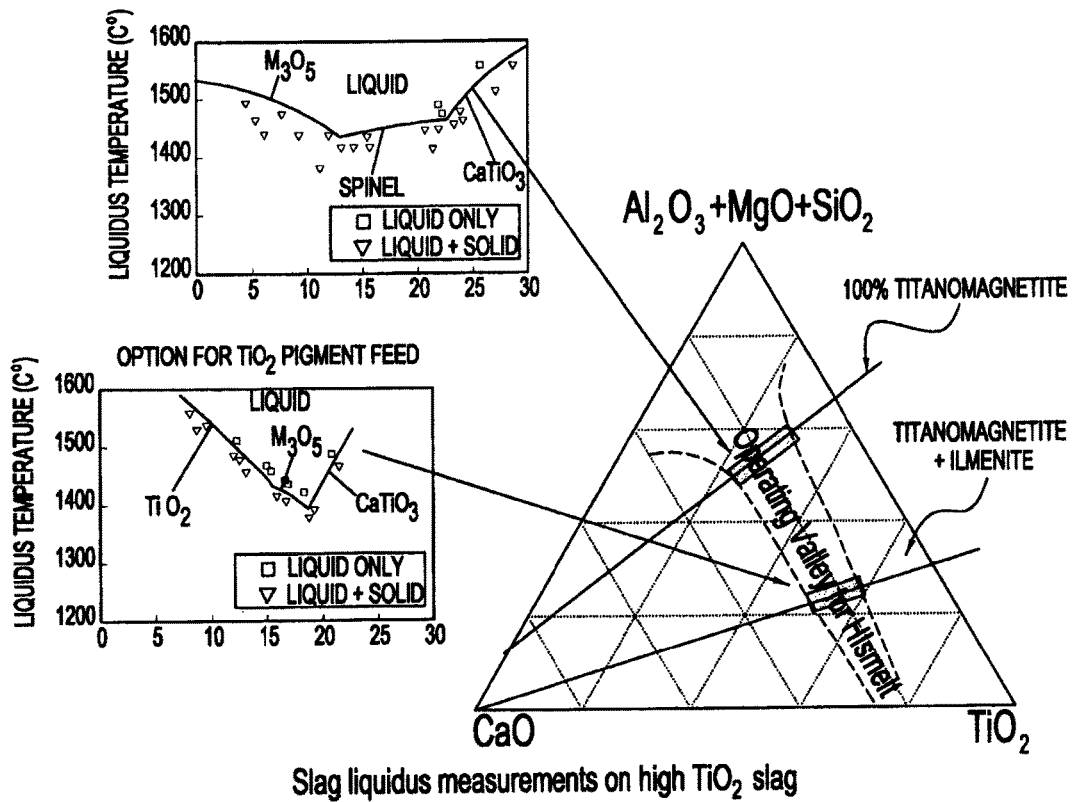
FIG. 3 is a pseudo-tertiary phase diagram for a slag and separate slag liquidus plots for two marked sections of the phase diagram for a high titanium oxide feed material in one embodiment of the direct smelting process of the present invention.

FIG. 3 is a pseudo-tertiary phase diagram for a slag and separate slag liquidus plots for two marked sections of the phase diagram for a high titanium oxide feed material in one embodiment of the direct smelting process of the present invention. The phase diagram focuses on (a) three main gangue constituents, namely alumina, magnesia, and silica, (b) a flux additive, namely calcia, and (c) titania. The phase diagram was sourced from University of Queensland researchers. The phase diagram defines an operating window for slag compositions that provide the required slag viscosities of 1-5 poise for the process. The Figure highlights two sections of the phase diagram and these sections show the significant change in liquidus temperatures across the selected compositions. It is particularly evident from these sections the considerable scope to precipitate out solid phases and thereby change the viscosity of the slag within the temperature range of 1400-1550° C. of the molten bath.

In more general terms, the following process features, separately or in combination, are relevant control parameters of the process.

(a) Controlling the slag inventory, i.e. the depth of the slag layer and/or the slag/metal ratio (typically the weight ratio of metal:slag to be between 3:1 and 1:1), to balance the positive effect of metal in the transition zone 23 on heat transfer with the negative effect of metal in the transition zone 23 on post combustion due to back reactions in the transition zone 23. If the slag inventory is too low the exposure of metal to oxygen is too high and there is reduced potential for post combustion. On the other hand, if the slag inventory is too high the lance 7 will be buried in the transition zone 23 and there will be reduced entrainment of gas into the free space 25 and reduced potential for post combustion.

(b) Selecting the position of the lance 7 and controlling injection rates of oxygen-containing gas and solids via the lance 7 and the lances 5 to maintain the essentially metal/slag free region around the end of the lance 7 and to form the transition zone 23 around the lower section of the lance 7.

(c) Controlling heat loss from the vessel by splashing with slag the sections of the side wall of the vessel 3 that are in contact with the transition zone 23 or are above the transition zone 23 by adjusting one or more of:
(i) the slag inventory; and
(ii) the injection flow rate through the lance 7 and the lances 5.

Many modifications may be made to the embodiment of the present invention described above without departing from the spirit and scope of the invention.

The invention claimed is:

1. A direct smelting process that comprises supplying
(a) a metalliferous feed material that contains iron oxides and at least 3 wt. % titanium oxides,
(b) a solid carbonaceous feed material, and
(c) an oxygen-containing gas
into a direct smelting vessel containing a molten bath of iron and slag and direct smelting the metalliferous feed material in the vessel and producing process outputs of molten iron, molten slag containing titanium oxides, and an off-gas, the process further comprising
injecting the metalliferous feed material at a rate so that FeO content in the slag is at least 3 to less than 10 wt. %, and
injecting the metalliferous feed material, solid carbonaceous feed materials, and oxygen-containing gas into the vessel and operating the direct smelting vessel at a temperature and pressure so that the molten slag is a slurry of a solid material and a liquid phase and the solid material is a solid oxide phase at the slag temperature in the process and has a viscosity in a range of 0.5-5 poise when the slag temperature is in a range of 1400-1550° C. in the molten bath in the direct smelting vessel; the solid material in the molten slag is at least 5 wt % and less than 30 wt. % of the molten slag; and the molten slag has an oxygen potential that is sufficiently high to minimize reduction of titanium oxides in the slag from a +4 valence state to a lower valence state;
wherein the metalliferous feed material and solid carbonaceous feed materials are injected to cause molten iron and slag to be projected into a gas space above the surface of the molten bath to provide heating by the post-combustion of smelting reaction gases.

2. The process defined in claim 1 comprising adjusting the slag composition and the temperature of the molten bath to be below the liquidus temperature of the slag so that the solid oxide phase precipitates from the liquid phase, thereby controlling the viscosity of the slag.

3. The process defined in claim 1 wherein the solid material in the molten slag is at least 10 wt. % of the molten slag and less than 30 wt % of the molten slag.

4. The process defined in claim 1 wherein solid material in the molten slag is 15-25 wt. % of the molten slag.

5. The process defined in claim 1 wherein the metalliferous feed material comprises any one or more than one of titanomagnetite and ilmenite.

6. The process defined in claim 5 wherein, when the metalliferous feed material consists of titanomagnetite, the titanium oxides are less than 40 wt. % of the metalliferous feed material.

7. The process defined in claim 5 or claim 6 wherein, when the metalliferous feed material consists of titanomagnetite, the titanium oxides are less than 30 wt. % of the metalliferous feed material.

8. The process defined in claim 5 wherein, when the metalliferous feed material comprises titanomagetite and ilmenite, the titanium oxides are less than 50 wt. % of the metalliferous feed material.

9. The process defined in claim 1 wherein the metalliferous feed material also comprises other metal oxides.

10. The process defined in claim 9 wherein, where the metalliferous material contains vanadium oxides, the process comprises producing process outputs of molten iron and vanadium, molten slag containing titanium oxides and vanadium oxides, and an off-gas.

11. The process defined in claim 1 comprising adjusting the weight ratio of the concentrations of iron in the slag to carbon in the molten iron to be less than 2:1.

12. The process defined in claim 1 comprising adjusting the weight ratio of the concentrations of iron in the slag to carbon in the molten iron to be less than 1.5:1.

13. The process defined in claim 1 comprising adjusting the weight ratio of the concentrations of iron in the slag to carbon in the molten iron to be 1:1 to 1.3:1.

* * * * *